Figure 1:
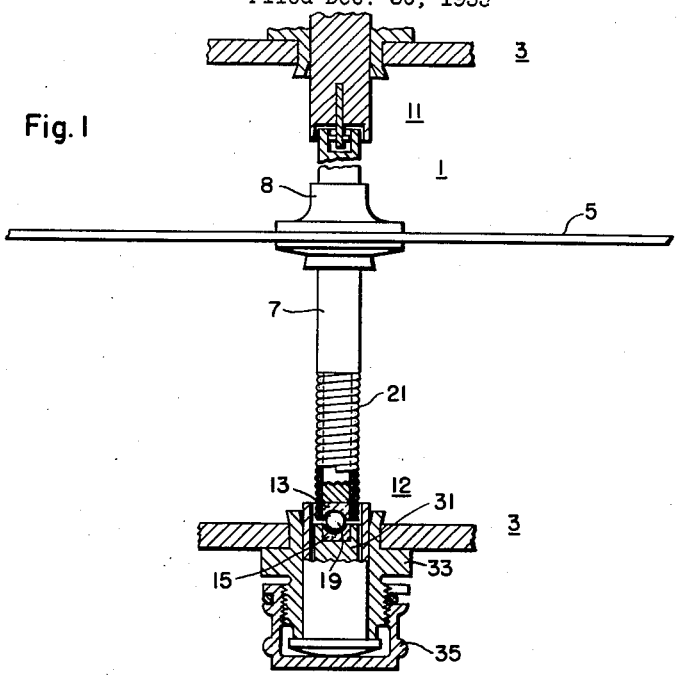

Dec. 23, 1958

C. BERGMANN 2,865,687

INSTRUMENT BEARING ASSEMBLY

Filed Dec. 30, 1953

WITNESSES
Edwin C. Bassler
David M. Schiller

INVENTOR
Charles Bergmann
BY C. L. Freedman
ATTORNEY

United States Patent Office 2,865,687
Patented Dec. 23, 1958

2,865,687

INSTRUMENT BEARING ASSEMBLY

Charles Bergmann, Bloomfield, N. J., assignor to Westinghouse Electric Corporation, East Pittsburgh, Pa., a corporation of Pennsylvania Application December 30, 1953, Serial No. 401,141

9 Claims. (Cl. 308—159)

This invention relates to bearing assemblies, and it has particular relation to bearing assemblies for electrical instruments.

Heretofore, instruments have been provided which include rotor structures supported for rotation by means of a suitable shaft. In order to mount the rotor structure for rotation relative to an associated stator structure, bearing assemblies have been provided by means of which the shaft is supported for rotation relative to the stator structure.

Bearing assemblies for electrical instruments have been provided which include one or more cup-shaped jewel bearing members associated with the rotor and stator structures with the cupped portions providing bearing surfaces which engage suitable pivots or ball-shaped members.

In the past, a number of problems have been encountered in connection with the mounting of the jewel bearings to the rotor and stator structures. In accordance with a prior art practice, the jewel bearings are mounted in suitable jewel mounts which are constructed of metallic materials such as brass or aluminum. In order to secure the jewel bearings to the associated jewel mounts, it has been necessary to perform a number of accurate machining operations upon the mounts. For example, the jewel mounts must be accurately machined initially to provide properly proportioned recesses for accommodating the jewel bearings. In addition, retaining shoulders must be formed on the jewel mounts subsequent to the positioning of the jewels in the recesses for the purpose of securing the jewel bearings to the mounts. Such machining operations must necessarily be performed with the jewel bearings positioned in the recesses of the mounts. This has resulted in a substantial percentage of breakage of the jewel bearings and, consequently, a substantial expenditure of time and money.

When jewel mounts are utilized to secure jewel bearings to the shafts of rotor structures of electrical instruments, additional machining operations have been required to provide suitably proportioned bores in the mounts for the purpose of accommodating the rotor shafts. Such machining operations are objectionable in that they are costly and time-consuming. Furthermore, considerable waste of costly parts results by reason of inaccurate machining of the jewel mounts and also by reason of damage to expensive jewel bearings during machining of the mounts with the jewels positioned in the mount recesses.

For different types of instruments, dimensions of the rotor shafts and the jewel bearings required may vary considerably. Consequently, it is necessary to maintain a large number of jewel mounts of various dimensions and configurations in stock. In addition, the various sized jewel mounts and jewel bearings must be grouped to provide matching pairs of bearings and mounts. Furthermore, close inspection of the assembled jewel bearings and mounts has been necessary to detect breakage and inaccuracies caused by the numerous machining operations referred to previously. These operations are expensive and time-consuming.

In accordance with the invention, the above-described problems and disadvantages are overcome by the provision of a jewel bearing mount of resilient construction.

In a preferred embodiment of the invention the jewel bearing mount comprises a coil spring preferably constructed of a stainless spring steel and having a number of closely spaced convolutions defining an axial passage of the coil spring. The passage is proportioned to receive a jewel bearing for securing such bearing in an operative position. By selecting the diameter of the passage to be smaller than the diameter of the smallest bearing encountered in practice when the spring is in an untensioned condition, tight engagement between the convolutions of the spring and the bearing is effected when the bearing is positioned within the passage.

If the coil spring is employed for the purpose of securing a bearing to the shaft of a rotor structure, then both the shaft and the bearing may be introduced into the passage of the spring to provide a resilient connection between the shaft and bearing. The diameter of that portion of the shaft which is to be positioned within the passage is preferably selected to be substantially equal to the diameter of the bearing employed.

When the spring is employed to secure a bearing to a rotor shaft, the shaft and bearing are preferably positioned within the passage of the spring with the end surface of the shaft in engagement with the base surface of the bearing.

It is, therefore, an object of the invention to provide an improved bearing assembly.

It is another object of the invention to provide an improved bearing assembly for electrical instruments.

It is a further object of the invention to provide a bearing assembly for an electrical instrument having a rotor structure including a shaft with the bearing assembly including a bearing member and resilient means connecting the bearing member to the shaft.

It is still another object of the invention to provide a bearing assembly as defined in the preceding paragraph wherein the resilient means comprises a coil spring having an axial passage proportioned to receive the bearing member and the shaft.

It is a still further object of the invention to provide a bearing assembly as defined in the preceding paragraph wherein the end of the shaft engages the base of the bearing member to provide abutting surfaces.

Figure 2:
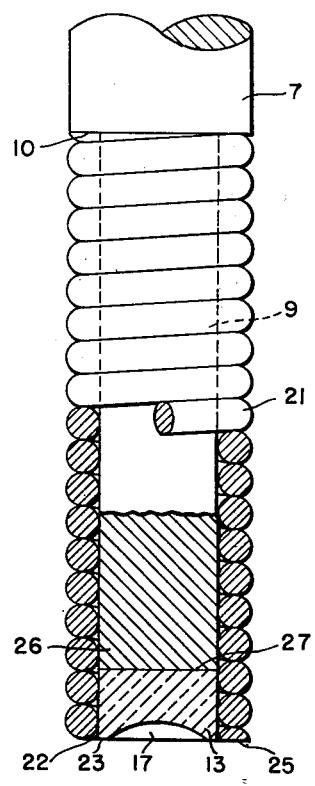

Other objects of the invention will be apparent from the following detailed description, taken in conjunction with the accompanying drawing, in which:

Figure 1 is a view in elevation with parts shown in section of a portion of an electrical instrument embodying the invention; and Figure 2 is an enlarged view of a portion of Fig. 1 with parts shown in section.

Referring to the drawing, there is shown in Fig. 1 a portion of an electrical instrument of the type having a rotor structure 1 mounted for rotation relative to a stator structure 3. Although the invention is applicable to any instrument of such type with the rotor structure thereof mounted for rotation about an axis extending in any desired direction, it will be described in connection with an alternating current watthour meter having a rotor structure mounted for rotation about a vertical axis.

As shown in Fig. 1 the rotor structure 1 includes an electroconductive disc 5 mounted for rotation under the influence of magnetic flux produced by a suitable magnetic structure (not shown) by means of a shaft 7 to which the disc 5 is secured by a hub 8. As shown, the shaft 7 may be provided with a portion 9 of reduced diameter defining a shoulder 10 of the shaft.

In order to mount the rotor structure 1 for rotation relative to the stator structure 3, an upper bearing assembly 11 and a lower bearing assembly 12 are provided. In the specific embodiment of Fig. 1, the lower bearing assembly 12 includes a pair of cooperating bearing members illustrated in the form of bearing jewels 13 and 15 carried respectively by the shaft 7 of the rotor structure 1 and a portion of the stator structure 3. The bearing members 13 and 15 are provided with cupped portions 17 and are preferably constructed of a material such as glass or sapphire. However, as will appear hereinafter, the present invention permits the utilization of bearing members constructed of fragile materials such as graphite.

In order to provide the bearing assembly 12 the bearings 13 and 15 are positioned relative to each other with the cupped portions 17 thereof defining a cavity proportioned to accommodate a suitable ball-shaped member 19. The ball 19 is preferably constructed of steel and is provided with a highly polished surface in order to reduce friction between the engaging surfaces of the ball and the cupped portions of the bearings. By such arrangement a substantially frictionless support is provided for the motor structure 1.

In accordance with the present invention, a bearing mount of resilient construction is employed for the purpose of mounting a bearing in an operative position in an electrical instrument. Referring to Fig. 2 there is illustrated a bearing mount 21 constructed in accordance with the teachings of the invention. As there shown, the mount 21 comprises a coil spring constructed of any suitable spring material. Preferably the spring is formed of stainless spring steel wire wound to provide a number of closely spaced convolutions defining an axial passage 22 of the coil. Preferably the ends of the coil are ground or filed to provide coil end surfaces which extend transverse to the axis of the coil. Burrs and other surface irregularities are preferably removed from the coil as by grinding or filing. The diameter of the passage 22 defined by the spring convolutions when the spring is in an untensioned condition is selected to be slightly less than the diameter of the smallest bearing encountered in practice.

In order to secure a bearing such as the bearing 13 relative to the spring mount 21, the bearing is positioned within the passage 22 to have the surface 23 of the bearing lie substantially in the plane defined by the surface 25 of the coil spring 21. With such arrangement, the spring 21 is spaced from the stator 3 so as not to interfere with the proper operation of the instrument. Furthermore, with such arrangement, the bearing can be easily removed from the spring coil 21 if replacement thereof becomes necessary. Inasmuch as the diameter of the passage 22 is selected to be slightly less than the diameter of the bearing, positioning of the bearing within the passage 22 causes the spring 21 to unwind whereby a number of convolutions of the spring 21 engage the lateral surface of the bearing to secure it in the proper position.

In order to secure the assembled bearing and mount to the shaft 7 of the rotor structure 1, the portion 9 of the shaft 7 is introduced into the passage 22 of the spring 21 to have the end 26 of the shaft 7 engage the base of the bearing as indicated by the line 27 of Fig. 2. The diameter of the portion 9 of the shaft 7 is selected to be substantially the same as the diameter of the bearing.

With the shaft 7 and bearing 13 positioned within the passage 22 of the spring 21 in the manner described, displacement of the bearing along the passage 22 in a direction toward the disc 5 during operation of the instrument is prevented. Relative displacement between the shaft 7 and the bearing 13 along axes transverse to the axis of the shaft 7 is opposed by the spring 21 and by friction between the end 26 of the shaft and the base of the bearing. It will be observed that an end of the spring 21 bears against the shoulder 10 of the shaft to prevent displacement of the spring axially of the shaft toward the disc 5.

It is to be understood that operations required to assemble the bearing assembly may be reversed from the order described in the preceding paragraph; that is, the shaft 7 may be initially introduced into the passage 22 of the spring 21 and then the bearing 13 may be introduced into the passage 22 at the opposite end of the spring with the base of the bearing and the end of the shaft 7 being in engagement. Assemblage of the bearing assembly in the manner just described may be desirable inasmuch as the bearing is subjected to less handling and, consequently, there is less chance of breakage of the bearing.

As mentioned hereinbefore, the lower bearing 15 also may be secured to the stator structure 3 by means of a resilient bearing mount such as the spring-type mount just described. However, as illustrated in Fig. 1, only the upper bearing 13 is secured by means of the spring-type mount. The lower bearing 15 is shown as being secured to the stator structure 3 by a conventional arrangement. Such arrangement commonly comprises a rigid metallic mount 31 which is secured to a portion of the stator 3 by means of a suitable bushing 33. The lower bearing 15 is positioned in a suitable recess provided in the mount 31 with the cupped portion of the bearing 15 facing the cupped portion of the bearing 13 to define a cavity proportioned to receive the ball member 19 as previously described. A suitable cap member 35 is provided having internal threads cooperating with threads of the bushing 33.

Although the invention has been described with reference to certain specific embodiments thereof, numerous modifications falling within the spirit and scope of the invention are possible.

I claim as my invention:

1. In a bearing assembly for mounting a shaft for rotation relative to a stator structure about the shaft axis, a bearing member, and a coil spring having a number of convolutions defining an axial passage of the spring, said shaft and said bearing member having respectively end and base surfaces, said bearing member and shaft being positioned within said passage with said surfaces in engagement along a plane transverse to said axis, the diameter of said passage being smaller than the diameters of said shaft and said bearing member when the spring is in an untensioned condition.

2. In an electrical instrument, a rotor structure mounted for rotation relative to a stator structure about an axis, said rotor structure including a shaft having an end surface, a bearing member having a base surface, and a resilient member having an axial passage, the diameter of the passage being smaller than the diameters of the shaft and the bearing member when the resilient member is in an untensioned condition, said shaft and said bearing member being positioned within said passage with said surfaces in engagement along a plane transverse to said axis.

3. In an electrical instrument, a rotor structure mounted for rotation relative to a stator structure about a vertical axis, said rotor structure including a shaft having a portion of reduced diameter defining a shoulder of said shaft, said portion of reduced diameter having a first end with an end surface, a bearing member having a base portion with a base surface, and a resilient member having an axial passage, the portion of reduced diameter of the shaft and the bearing member being positioned within said passage with said end and base surfaces in engagement along a plane substantially transverse to the vertical axis, said resilient member having a second end engaging the shoulder of said shaft, the diameter of said passage being smaller than the diameters of said bearing member and said portion of reduced diameter of the shaft when the resilient member is in an untensioned condition.

4. In a mechanical system, a rotor structure mounted for rotation relative to a stator structure about a vertical axis, said rotor structure including a shaft having a portion of reduced diameter defining a shoulder of the shaft, said portion of reduced diameter having a first end with an end surface, first and second bearing jewels each having a cup-shaped recess, means securing said first bearing jewel to said stator structure, additional means securing said second bearing jewel to said rotor structure, said bearing jewels being secured with the recesses thereof in opposing relation to define a cavity, and a ball-shaped member positioned within said cavity to provide a substantially frictionless support for said rotor structure, said additional means comprising a coil spring having a number of convolutions defining an axial passage of the spring, said second bearing jewel and the portion of reduced diameter of the shaft being positioned within said passage, said second bearing jewel having a base portion with a base surface, the end surface of said shaft and the base surface of said second bearing jewel being in engagement along a plane transverse to said axis, said spring having a second end engaging the shoulder of said shaft.

5. In a bearing assembly, a bearing jewel formed of graphite having a cup-shaped recess, and a coil spring having a number of convolutions defining an axial passage of the spring, said passage having a diameter smaller than the diameter of the bearing jewel when the spring is in an untensioned condition, said bearing jewel being positioned within the passage adjacent a first end of the passage with said recess opening toward said first end.

6. In a watthour meter, a stator structure, a rotor structure including an electroconductive armature secured to a shaft, and bearing means mounting the rotor structure for rotation about a vertical axis relative to upper and lower portions of the stator structure, said bearing means including a first bearing jewel having a first cup-shaped recess, means securing the first bearing jewel to the lower stator portion with the first recess opening toward the upper stator portion, a second bearing jewel formed of graphite having a second cup-shaped recess, a coil spring having a number of convolutions defining an axial passage of the spring, a portion of said shaft being positioned within the passage, said second bearing jewel being positioned within the passage adjacent the first bearing jewel with said second recess opening toward the first recess to define therewith a cavity, and a ball-shaped member positioned within the cavity to provide a substantially frictionless support for the rotor structure, the diameter of the passage being smaller than the diameters of the second bearing jewel and said portion of the shaft when the spring is in an untensioned condition.

7. In a watthour meter, a stator structure, a rotor structure including an electroconductive armature secured to a shaft, said shaft having a portion of reduced diameter defining a shoulder of the shaft, said shaft portion of reduced diameter having a first end with an end surface, and bearing means mounting the rotor structure for rotation about a vertical axis relative to upper and lower portions of the stator structure, said bearing means including a first bearing jewel having a first cup-shaped recess, means securing the first bearing jewel to the lower stator portion with the first recess opening toward the upper stator portion, a second bearing jewel formed of graphite having a second cup-shaped recess, said second bearing jewel having a base portion with a base surface, a coil spring having a number of convolutions defining an axial passage of the spring, said shaft portion of reduced diameter extending into the passage from one end of the spring with said one spring end engaging said shoulder, said second bearing jewel being positioned within the passage adjacent the other end of the spring with the base surface engaging said end surface along a plane substantially transverse to the vertical axis to have the second recess opening toward the first recess to define therewith a cavity, and a ball-shaped member positioned within the cavity to provide a substantially frictionless support for the rotor structure, the diameter of the passage being smaller than the diameters of the second bearing jewel and the shaft portion of reduced diameter when the spring is in an untensioned condition.

8. In a mechanical system, a stator structure, a rotor structure including a shaft, and bearing means mounting the rotor structure for rotation about an axis relative to first and second spaced portions of the stator structure, said bearing means including a first bearing jewel having a first cup-shaped recess, means securing the first bearing jewel to the first stator portion with the first recess opening toward the second stator portion, a second bearing jewel having a second cup-shaped recess, a resilient member having an axial passage, a portion of said shaft being positioned within said passage, said second bearing jewel being positioned within the passage adjacent the first bearing jewel with said second recess opening toward the first recess to define therewith a cavity, and a ball-shaped member positioned within the cavity to provide a substantially frictionless support for the rotor structure, the diameter of the passage being smaller than the diameters of the second bearing jewel and said portion of the shaft when the resilient member is in an untensioned condition.

9. In an electrical instrument, a stator structure, a rotor structure including a shaft, and bearing means mounting the rotor structure for rotation about a vertical axis relative to upper and lower portions of the stator structure, said bearing means including a first bearing jewel having a first cup-shaped recess, means securing the first bearing jewel to the lower stator portion with the first recess opening toward the upper stator portion, a second bearing jewel formed of graphite having a second cup-shaped recess, a resilient member having an axial passage, a portion of said shaft being positioned within said passage, said second bearing jewel being positioned within the passage adjacent the first bearing jewel with said second recess opening toward the first recess to define therewith a cavity, and a ball-shaped member positioned within the cavity to provide a substantially frictionless support for the rotor structure, the diameter of the passage being smaller than the diameters of the second bearing jewel and said portion of the shaft when the resilient member is in an untensioned condition.

References Cited in the file of this patent

UNITED STATES PATENTS

| | | |
|---|---|---|
| 2,041,896 | McQueer | May 26, 1936 |
| 2,203,411 | Green | June 4, 1940 |
| 2,316,920 | Weber | Apr. 20, 1943 |
| 2,651,550 | Sharp | Sept. 8, 1953 |
| 2,714,536 | Wirth | Aug. 2, 1955 |

FOREIGN PATENTS

| | | |
|---|---|---|
| 329,404 | Great Britain | May 22, 1930 |
| 426,022 | Great Britain | Mar. 26, 1935 |
| 510,119 | Great Britain | July 27, 1939 |